(12) United States Patent
Numajiri

(10) Patent No.: US 8,308,434 B2
(45) Date of Patent: Nov. 13, 2012

(54) WIND TURBINE GENERATOR

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/091,587

(22) Filed: Apr. 21, 2011

(65) Prior Publication Data

US 2011/0241353 A1    Oct. 6, 2011

Related U.S. Application Data

(63) Continuation of application No. PCT/JP2011/051772, filed on Jan. 28, 2010.

(51) Int. Cl.
    *F01D 5/08*    (2006.01)
(52) U.S. Cl. ...................... 416/95; 416/245 R
(58) Field of Classification Search .................. 415/4.3, 415/4.5, 115, 116; 416/245 R
    See application file for complete search history.

(56) References Cited

U.S. PATENT DOCUMENTS

| 7,161,260 | B2 | 1/2007 | Krueger-Gotzmann et al. | |
| 7,427,814 | B2 * | 9/2008 | Bagepalli et al. | 290/55 |
| 7,594,800 | B2 | 9/2009 | Teipen | |
| 7,637,715 | B2 * | 12/2009 | Battisti | 415/115 |
| 8,053,918 | B2 * | 11/2011 | Wobben | 290/55 |
| 2006/0120862 | A1 * | 6/2006 | Jannasch et al. | 415/175 |
| 2009/0060748 | A1 * | 3/2009 | Landa et al. | 416/93 R |
| 2010/0061853 | A1 * | 3/2010 | Bagepalli | 416/95 |
| 2010/0127502 | A1 | 5/2010 | Uchino et al. | |
| 2010/0148514 | A1 | 6/2010 | Sato et al. | |

FOREIGN PATENT DOCUMENTS

| JP | 2005-69082 A | 3/2005 |
| JP | 2009-127505 A | 6/2009 |
| JP | 2010-007649 | 1/2010 |

* cited by examiner

*Primary Examiner* — Christopher Verdier
*Assistant Examiner* — Andrew C Knopp
(74) *Attorney, Agent, or Firm* — Manabu Kaneskaa; Benjamin J. Hauptman; Kenneth M. Berner

(57) ABSTRACT

A wind turbine generator according to the present invention includes: a rotor head equipped with wind turbine blades to constitute a wind turbine rotor blade; a nacelle that bears a rotation shaft of the rotor head and houses a generator that generates electricity by a rotation of the rotor head; a tower that supports the nacelle; a rotor head cover that covers the rotor head; an outside-air intake that is provided on a distal end part of the rotor head cover and takes in the outside wind; an outside-air delivery communicating parts that delivers the outside air, which has been taken into the rotor head cover from the outside-air intake, to an inside of the nacelle; and cooling air outlets that are provided in a region of the outer surface of the nacelle that experiences a negative pressure due to the outside wind.

6 Claims, 4 Drawing Sheets

US 8,308,434 B2

WIND TURBINE GENERATOR

CROSS REFERENCE TO RELATED APPLICATIONS

This is a continuation of International Application PCT/JP2011/051772, with an international filing date of Jan. 28, 2011, which is hereby incorporated by reference herein in its entirety.

TECHNICAL FIELD

The present invention relates to a wind turbine generator that cools devices in a nacelle by introducing outside air (outside wind).

BACKGROUND ART

A standard wind turbine generator has a nacelle that is installed in a manner that allows yawing on top of a pillar like tower, which is erected upright on the ground or is installed offshore, and wind turbine blades are supported on a rotor head that is supported so as to be rotatable about a shaft on the front side of this nacelle, thereby constituting a wind turbine rotor blade. The respective wind turbine blades receive wind force to rotate the rotor head, and this rotation is speeded-up through a gear box to drive a generator, which is installed inside the nacelle, thereby generating electricity. The nacelle is slew drive controlled such that the rotation center axis of the rotor head (wind turbine rotor blade) always points in the upwind direction to achieve efficient, generation of electricity. The nacelle houses, in addition to the generator, heat generating devices of various types, such as an inverter, a transformer, and so forth. In order to maintain stable operation of the wind turbine generator, these electrical devices need to be properly cooled.

As disclosed in Patent Literature (hereinafter, referred to as "PTL") 1, for example, an internal cooling structure of a nacelle of a conventional wind turbine generator achieves cooling of the heat generating devices by providing an electric ventilation fan inside the nacelle to forcedly introduce the outside cold air into the nacelle. In addition, as disclosed in PTL 2, there is a wind turbine generator in which the heat generating devices installed in a nacelle are encapsulated, thereby making a closed-loop air duct for delivering cooling air into the capsule with a fan; a cooler is provided on the downwind side of the wind turbine blades along this closed-loop air duct to enable air-cooling of the cooler with the outside air, thereby achieving heat exchange with the cooling air flowing inside the cooler.

As disclosed in PTLs 3 and 4, there are wind turbine generators that are provided with an outside-air intake for taking in the outside wind on the front of a rotor head to allow cooling of internal devices in the rotor head with the outside air from this intake; however, all of these wind turbine generators merely take in the outside air into the rotor head, and none of them perform cooling of the interior of the nacelle.

CITATION LIST

Patent Literature

{PTL 1} Japanese Unexamined Patent Application, Publication No, 2010-007649
{PTL 2} U.S. Pat. No. 7,161,260, specification
{PTL 3} U.S. Pat. No. 7,594,800, specification
{PTL 4} United States Patent Application, Publication, No. 2009/0060748

SUMMARY OF INVENTION

Technical Problem

Since the wind turbine generator in PTL 1 has a configuration in which an electric ventilation fan is used to forcedly take the outside air into the nacelle, a space for installing the ventilation fan is required inside the nacelle, which has resulted in limited design flexibility. In addition, a part of the electrical power that has been generated by the generator is consumed by the ventilation fan, resulting in a non-negligible loss of energy. Furthermore, a grating noise of the ventilation fan spoils the quiet and calm image of wind turbine generators.

In addition, in the wind turbine generator in PTL 2, there is a problem in that the nacelle becomes large as a whole since the complexity of the internal structures of the nacelle is increased, and the air-cooled cooler becomes inevitably large. Moreover, since sufficient measures must be taken against, corrosion of the cooler, which is constantly exposed to the outside air, there is a problem in that the production cost of the wind turbine generator is increased due to these factors.

The present invention has been conceived in view of the circumstances described above, and an object thereof is to provide a wind turbine generator that, by having a simple configuration that involves no energy loss, is capable of maintaining the soundness of the internal devices by adequate cooling of heat generating devices installed inside the nacelle and by preventing the intrusion of rainwater.

Solution to Problem

A first aspect of the present invention for solving the above-described problems employs an upwind wind turbine generator that is controlled such that a wind turbine rotor blade faces the upwind side, including: a rotor head equipped with wind turbine blades, to constitute the wind turbine rotor blade; a nacelle that bears a rotation shaft of the rotor head and houses a generator that generates electricity by a rotation of the rotor head; a tower that supports the nacelle; a rotor head cover that covers the rotor head; an outside-air intake that is provided on a distal end part of the rotor head cover and takes in outside wind; an outside-air delivery communicating part that delivers the outside air, which has been taken into the rotor head cover from the outside-air intake, to an inside of the nacelle; and a cooling air outlet that is provided in a region of an outer surface of the nacelle that experiences a negative pressure due to the outside wind.

According to the above-described configuration, when the wind turbine rotor blade is rotated by the wind force and electricity is being generated, the outside wind is taken in from the outside-air intake that is provided on the distal end part of the rotor head cover and points to the upwind side all the time, this air flows through the inside of the rotor head cover as the cooling air, the air further flows into the nacelle through the outside-air delivery communicating part, and the air is discharged from the cooling air outlet after cooled the space inside the nacelle.

Since the outside-air intake always points to the upwind side and the cooling air outlet is provided in the region that experiences a negative pressure due to the outside wind, the effect of taking the outside air in by the outside-air intake and the effect of sucking the inside air out by the cooling air outlet are combined to allow more outside air to be taken into the nacelle. Therefore, an electric ventilation fan need not be installed inside the nacelle as in the related art, and it is possible to adequately cool heat generating devices installed inside the nacelle with a simple configuration that involves no energy loss.

A second aspect of the present invention is a wind turbine generator, according to the first aspect of the present invention, wherein the outside-air delivery communicating part has an air delivering hole formed an aperture formation on a rear side of the rotor head cover and an air receiving hole formed an aperture formation on a front side of the nacelle, wherein the air delivering hole and the air receiving hole have a shape that allows communication between the air delivering hole and at least a part of the air receiving hole all the time regardless of a rotational position of the rotor head cover.

According to the above-described configuration, the outside air introduced from the outside-air intake flows into the nacelle via the air delivering holes and the air receiving holes that configure the outside-air delivery communicating part. The air delivering holes and the air receiving holes are in communication at all times regardless of the rotational positions of the rotor head cover. Thus, it is possible to deliver the outside air stably towards the inside of the nacelle from the inside of the rotor head cover, and so, it is possible to adequately cool heat generating devices installed inside the nacelle.

A third aspect of the present invention is a wind turbine generator, according to the second aspect of the present invention, further including a rotor-head-cover internal air duct that communicates with the air delivering hole through a space between the rotor head and the rotor head cover from the outside-air intake, wherein the rotor head has a structure sealed against the rotor-head-cover internal air duct.

According to the above-described configuration, since the rotor head has a structure sealed against the rotor-head-cover internal air duct, the outside air introduced from the outside-air intake is prevented from flowing into the inside of the rotor head while flowing through the rotor-head-cover internal air duct. Thus, the flow volume and the flow rate of the outside air introduced from the outside-air intake are not decreased, and the introduced outside air is efficiently delivered to the nacelle side. Thus, it is possible to cool the heat generating devices installed inside the nacelle adequately. Although the rotor head has a sealed structure, since the outside air flows along the outer surface thereof, internal devices of the rotor head are also cooled.

A fourth aspect of the present invention is a wind turbine generator, according to the first aspect of the present invention, wherein the outside-air intake is provided with a contaminant separation member that separates contaminant contained in outside air.

According to the above-described configuration, since contaminants, such as water, dust, and so forth, that are contained in the outside air introduced from the outside-air intake are separated by the contaminant separation member, it is possible to prevent devices installed inside the rotor head and the nacelle from being adversely affected due to contaminants, and it is possible to cool the respective devices adequately.

A fifth aspect of the present invention is a wind turbine generator, according to the first aspect of the present invention, further including an outside-air anti-leaking structure that is formed between the rotor head cover and the nacelle and that prevents a flow out of outside air flowing inside the rotor head cover.

According to the above-described configuration, even when the outside air introduced from the outside-air intake tends to flow out to the outside from the connection portion between the rotor head cover and the nacelle, it is avoided by the outside-air anti-leaking structure; therefore, the outside air is delivered to the nacelle side without being decreased in flow volume, and thereby, it is possible to adequately cool heat generating devices installed inside the nacelle.

A sixth aspect of the present invention is a wind, turbine generator, according to the first aspect of the present invention, further including a front aperture that takes in the outside wind and that is formed in a region of the nacelle that is not hidden by the rotor head cover when viewed from the rotor head side.

According to the above-described configuration, since, apart from the outside-air intake provided on the rotor head cover, the outside air is also taken into the nacelle from the front apertures that are provided on the nacelle, it is possible to adequately cool heat generating devices installed inside the nacelle.

A seventh aspect of the present invention further includes, according to the first aspect of the present invention, a rainwater-intrusion preventing structure that is formed between the rotor head cover and the nacelle and prevents intrusion of rainwater.

According to the above-described configuration, intrusion of rainwater from a cap between the rotor head cover and the nacelle is prevented and the soundness of the internal devices is maintained.

Advantageous Effects of Invention

As described above, according to a wind turbine generator of the present invention, since it has a simple configuration that involves no energy loss, it is possible to maintain the soundness of the internal devices by adequate cooling or heat generating devices installed inside the nacelle and by preventing intrusion of rainwater.

DESCRIPTION OF EMBODIMENTS

An embodiment of a wind turbine generator according to the present invention will be described below with reference to the drawings.

Figure 1:
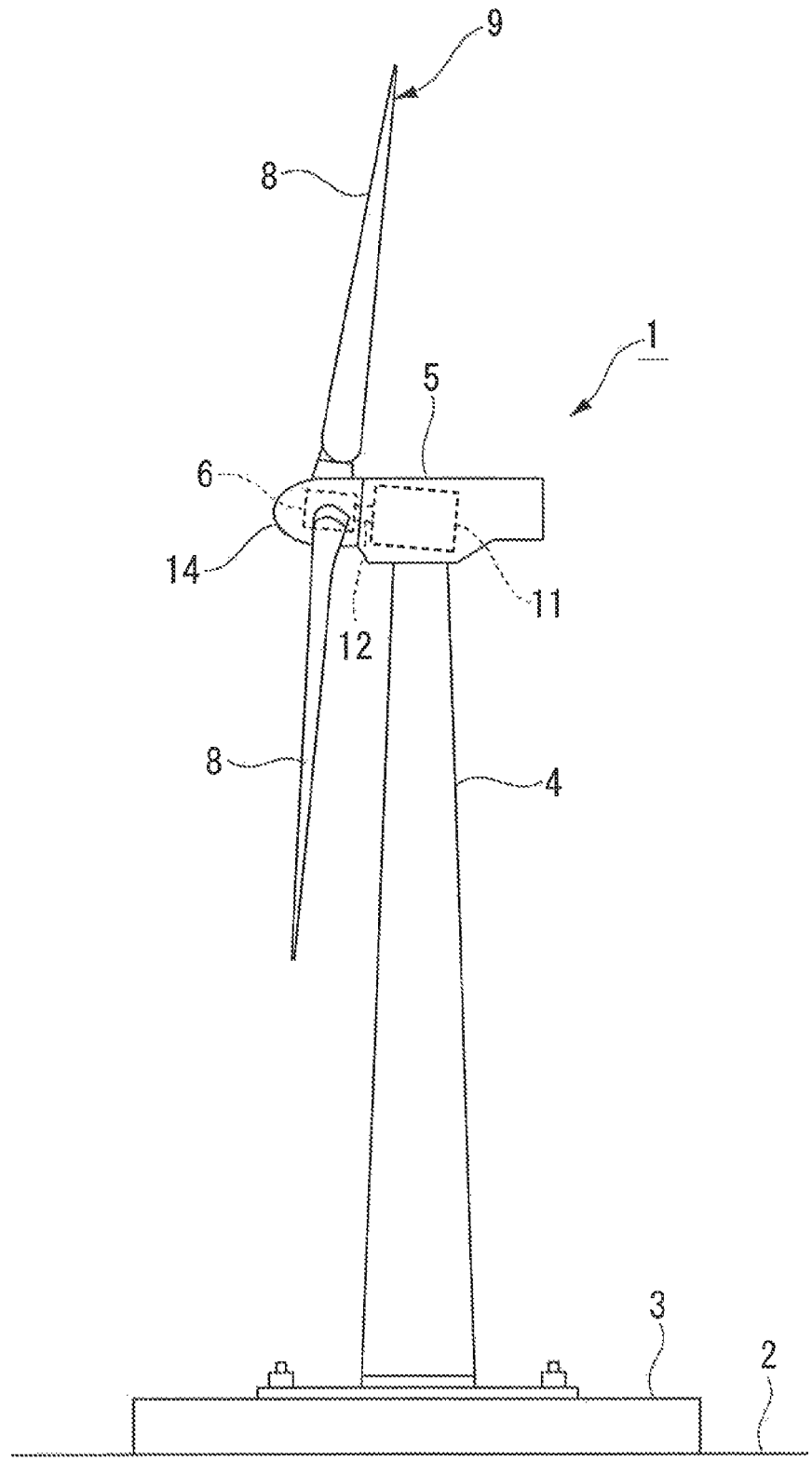
FIG. 1 is a side view showing an example of a wind turbine generator to which the present invention is applicable.

FIG. 1 is a side view showing an example of a wind turbine generator to which the present invention is applicable. This wind turbine generator 1 includes a tower 4 that is erected upright on a steel-reinforced concrete foundation 3, which is buried under the ground, for example, a nacelle 5 that is installed at the top of this tower 4, and a rotor head 6 that is supported so as to be rotatable about a substantially horizontal lateral rotation axis and that is provided on the front end side of the nacelle 5.

A plurality of (for example, three) wind turbine blades 8 extending in radial directions are attached to the rotor head 6, thereby constituting a wind turbine rotor blade 9. A generator 11 is accommodated and installed inside the nacelle 5 and a rotation shaft 12 of the rotor head 6 (the wind turbine rotor blade 9) is connected to a main shaft of the generator 11 via a gear box (not shown). Therefore, the wind force of the outside wind striking the wind turbine blades 8 is converted to rotational motive force that causes the rotor head 6 and the rotation shaft 12 to rotate, and then, the generator 11 is driven to generate electricity. The rotor head 6 is covered by a rotor head cover 14.

The nacelle 5 can slew in the horizontal direction at the top of the tower 4 together with the wind turbine rotor blade 9. The wind turbine generator 1 is an upwind type that is controlled such that the wind turbine rotor blade 9 faces to the upwind side, and this wind turbine generator 1 is controlled by a driving device and a control device (not shown) so as to be capable of generating electricity efficiently by being constantly pointed in the upwind direction. In this embodiment, the upwind side of the nacelle 5 is referred to as the "front side" and the downwind side thereof is referred to as the "rear side".

In addition to the generator 11, various types of heat generating devices, such as a main bearing, a gear box, an inverter, a transformer and so forth (not shown), are installed inside the nacelle 5. In addition, a known hydraulic- or electrical-pitch driving device (not shown) that adjusts the pitch angle of the wind turbine blades 8 to the optimal angle appropriate to the level of flow volume is provided inside the rotor head 6. This pitch driving device is also one of the heat generating devices that generates heat during operation.

Figure 2:
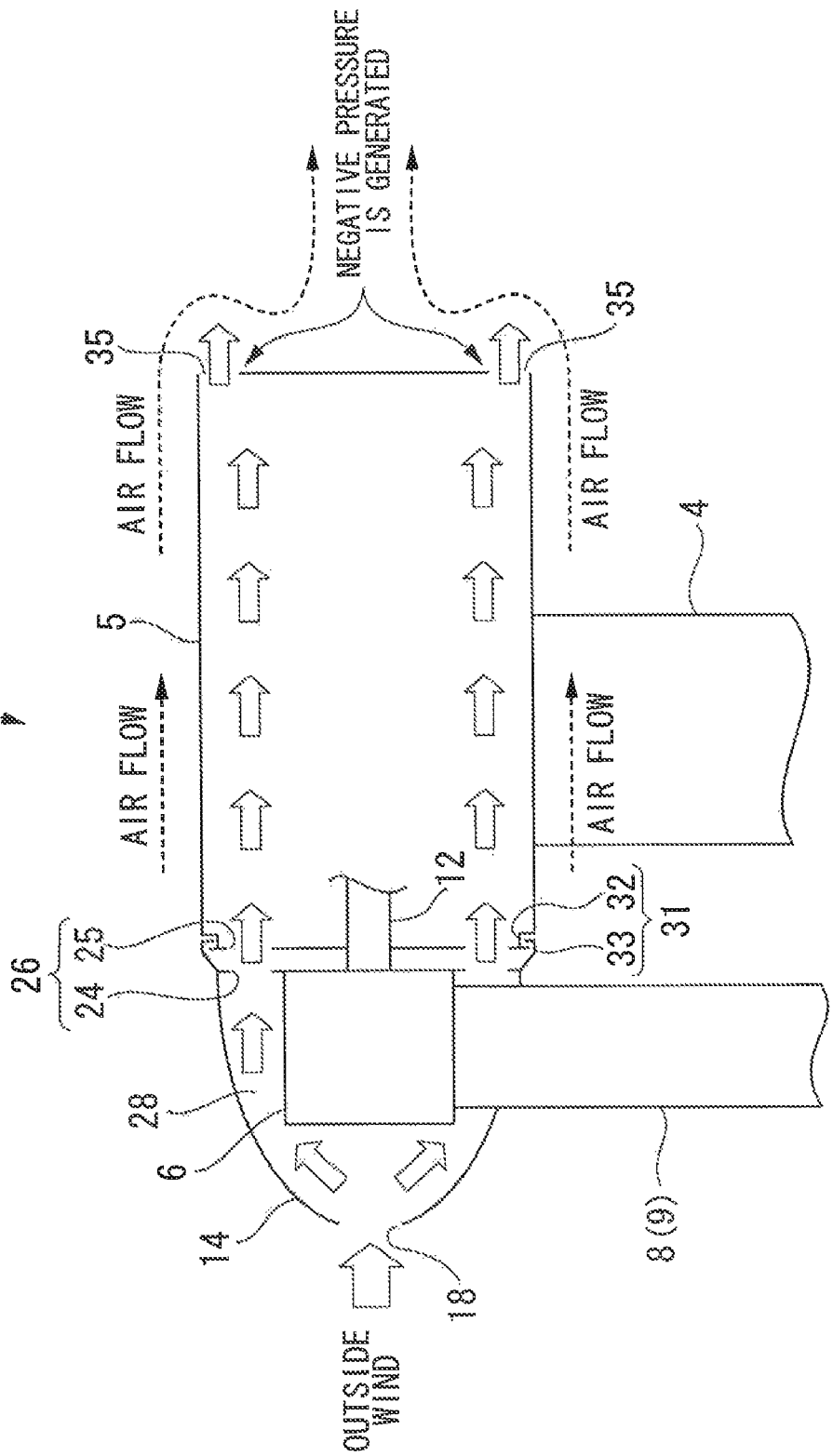
FIG. 2 is a longitudinal sectional view of the vicinity of a nacelle, a rotor head, and a rotor head cover showing an embodiment of the present invention.
Figure 3:
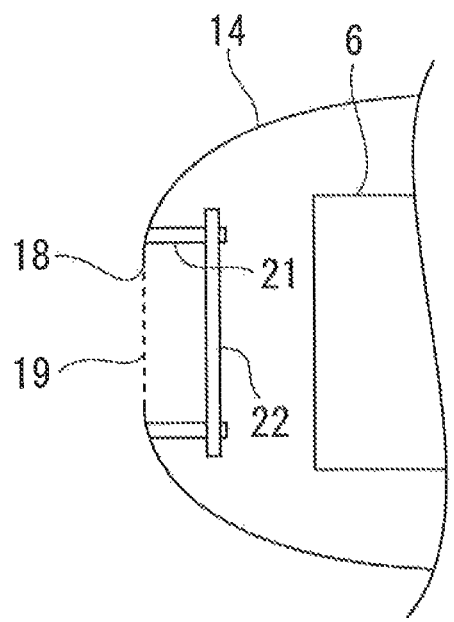
FIG. 3 is a longitudinal sectional view showing a distal end part of the rotor head cover, an outside-air intake, and a baffle plate (contaminant, separation member).
Figure 4:
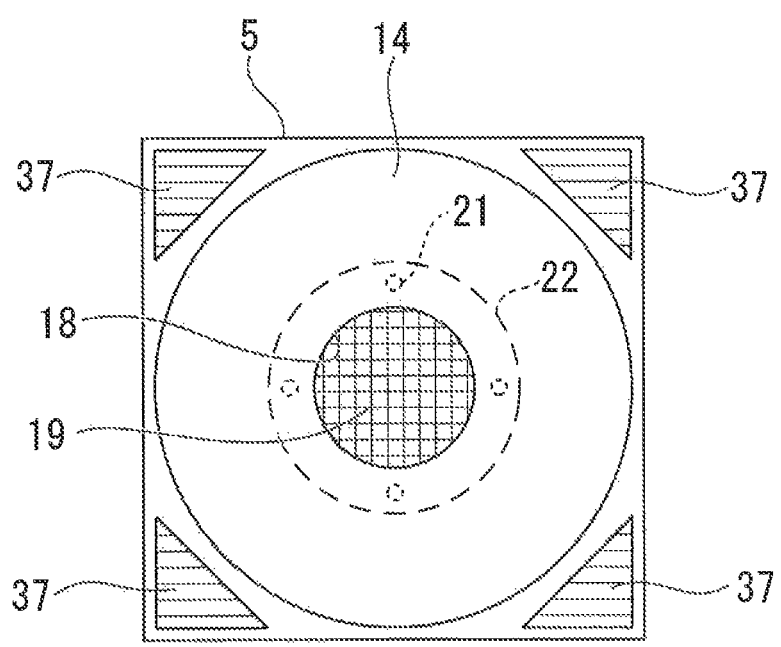
FIG. 4 is a front view showing the front side of the rotor head cover and the nacelle.

As shown in FIGS. 2 to 4, an outside-air intake 18 for taking in the outside wind is provided on the distal end part of the rotor head cover 14. This outside-air intake 18 is formed into a circular hole on the distal end part of the rotor head cover 14, and is covered with a grill (net) 19 for preventing the entry of flying objects, such as birds etc. In addition, a baffle plate 22 is provided inside the outside-air intake 18 via four pillars 21, for example. By being located away from the outside-air intake 18 towards the inner side of the rotor head cover 14, this baffle plate 22 functions as a contaminant separation member that separates contaminants, in particular, water such as rain, snow, and so forth that are contained in the outside air taken into the rotor head cover 14 from the outside-air intake 18.

Figure 5:
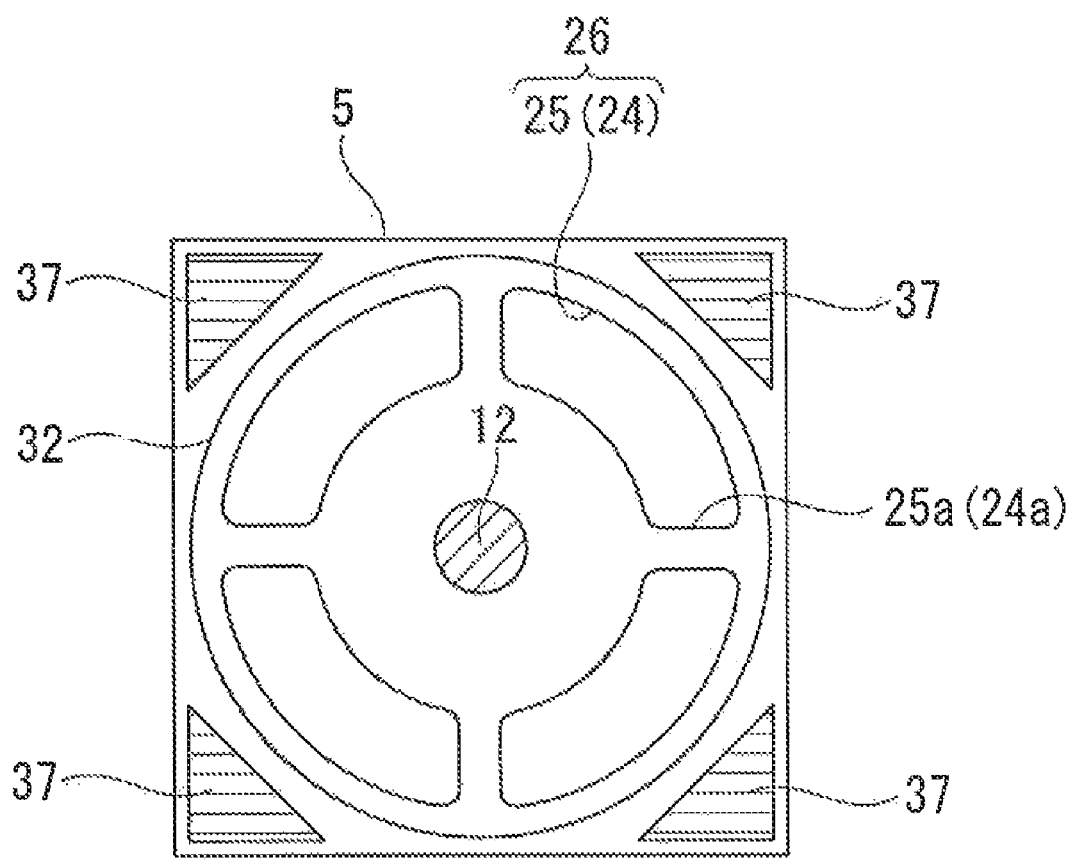
FIG. 5 is a view showing an air delivering hole formed an aperture formation on the rear side of the rotor head cover and an air receiving hole formed an aperture formation on the front side of the nacelle.

Furthermore, as shown in FIGS. 2 and 5, air delivering holes 24 are formed an aperture formation at the rear side of the rotor head cover 14 and air receiving holes 25 are formed an aperture formation on the front side of the nacelle, and these air delivering holes 24 and air receiving holes 25 constitute outside-air delivery communicating parts 26. These outside-air delivery communicating parts 26 function as air ducts that deliver the outside air, which has been taken into the rotor head cover 14 from the outside-air intake 18, to the inside of the nacelle 5.

The air delivering holes 24 and the air receiving holes 25 have shapes that allow communication between the air delivering holes 24 and the air receiving holes 25 all the time regardless of the rotational positions of the rotor head cover 14. In other words, in this embodiment, both the air delivering holes 24 and the air receiving holes 25 are formed to have four fan-shaped openings surrounding the rotation shaft 12 of the rotor head 6. Since the opening areas of the respective air delivering holes 24 and the air receiving holes 25 axe larger than the areas (widths) of pillar parts 24a and 25b that are formed between the respective opening portions, even if the rotor head cover 14 is rotated with respect to the nacelle 5, the air delivering holes 24 and most portions of the air receiving holes 25 are in constant communication. The shapes of the air delivering holes 24 and the air receiving holes 25 are not limited to the fan-shape, and they may have other shapes, such as a circular shape.

In addition, as shown in FIG. 2, a rotor-head-cover internal air duct 23 is defined inside the rotor head cover 14. This rotor-head-cover internal air duct 28 is a duct that communicates the outside-air intake 18 and the air delivering holes 24 through the space between the rotor head 6 and the rotor head cover 14, and the rotor-head-cover internal air duct 28 is formed so as to surround the rotor head 6. The rotor head 6 has a sealed structure against the rotor-head-cover internal air duct 28.

The respective wind turbine blades 8 are rotatably fitted to the rotor head 6 at the base portion thereof, and the pitch angle is changed by being rotated relative to the rotor head 6. A sealing member (not shown) is used to achieve fluid tight sealing between the base portion of the respective wind turbine blades 8 and the rotor head 6. Therefore, the outside air taken in from the outside-air intake 18 does not flow into the inside of the rotor head 6 while flowing through the rotor-head-cover internal air duct 28. A rainwater-intrusion preventing structure having a labyrinth-like cross-section (not shown) is provided between the respective wind turbine blades 8 and the rotor head cover 14. Thus, the airflow flowing through the rotor-head-cover internal air duct 28 is less prone to flow out to the outside through a gap between the respective wind turbine blades 8 and the rotor head cover 14.

On the other hand, as shown in FIG. 2, an outside-air anti-leaking structure 31 is provided on the connection portion between the rotor head cover 14 and the nacelle 5. This outside-air anti-leaking structure 31 is constituted of, for example, an annular internal step 32 that is formed on the front side of the nacelle 5 and an outer step 33 that is formed at the peripheral portion on the rear end of the rotor head cover 14, such that the outer step 33 surrounds the internal step 32 by overlapping, but not making contact with, the outer circumferential side of the internal step 32. It is preferable to make the gap between the outer step 33 and the internal step 32 as narrow as possible.

By providing this outside-air anti-leaking structure 31, the airflow that has gassed the rotor-head-cover internal air duct 28 formed inside the rotor head cover 14 is prevented from flowing out to the outside from the connection portion between the rotor head cover 14 and the nacelle 5, and therefore, this airflow is efficiently delivered into the nacelle 5 via the outside-air delivery communicating parts 26 (the air delivering holes 24 and the air receiving holes 25).

In addition, the outside-air anti-leaking structure 31 also functions as a rainwater-intrusion preventing structure. In other words, the outside-air anti-leaking structure 31 has a cross-sectional shape in which the internal step 32 and the outer step 33 are engaged with each other and a labyrinth-like gap is formed between them; therefore, the intrusion of rainwater to the inside through this gap is avoided.

On the other hand, a plurality of cooling air outlets 35 are provided at regions of the outer surface of the nacelle 5 that are subjected to a negative pressure due to the outside wind, for example, in the vicinity of the outer peripheral portion of the rear side of the nacelle 5. As shown in FIG. 2, since the nacelle 5 is slew controlled such that the rotor head 6 side always points in the upwind direction, the airflow of the outside wind flows over the surface of the nacelle 5 from the front to the rear and forms a flow that is drawn into the rear side of the nacelle 5. As described above, a strong negative pressure is generated at the region where the airflow is drawn into the rear side of the nacelle 5, especially at the outer peripheral portion side of the rear side of the nacelle 5. Therefore, by providing the cooling air outlets 35 in the vicinity of the outer peripheral portions of the rear side of The nacelle 5, the air inside the nacelle is sucked through the cooling air outlets 35 by the above-described negative pressure.

Furthermore, opening portions for taking in the outside wind are also formed in the regions of the nacelle 5 that are not hidden by the rotor head cover 14 when viewed from the rotor head 6 side. In this embodiment, for example, four front apertures 37 are formed at four corners of the front side of the nacelle 5 that has a square shape when viewed from the rotor head 6 side. The outside wind is also taken into the nacelle 5 from these front apertures 37. However, the positions of the front apertures 37 are not limited to these positions, and the front apertures may be provided in other regions of the nacelle 5.

With the wind turbine generator 1 configured as described above, the wind turbine, rotor blade 9 are rotated by the outside wind blowing from the front side thereof, the rotation is speeded-up and transmitted to the generator 11, and thereby, the generator 11 is driven to generate electricity. At the same time, the outside wind is taken in from the outside-air intake 18 that is provided on the distal end part of the rotor head cover 14 and that always points to the upwind side. This air flows through the rotor-head-cover internal air duct 28 formed inside the rotor head cover 14. The air is then delivered into the nacelle 5 via the outside-air delivery communicating parts 26 (the air delivering holes 24 and the air receiving holes 25), and after cooling the several heat generating devices, such as the generator 11, the air is discharged to the outside through the cooling air outlets 35 formed on the rear side of the nacelle 5.

While the outside-air intake 18 always points to the upwind side, the cooling air outlets 35 are provided in the region of the downwind side of the nacelle 5 that is subjected to the strongest negative pressure by the outside wind. Therefore, the effect of taking the outside air in from the outside-air intake 18 and the effect of sucking the inside air out from the cooling air outlets 35 are combined to allow more outside air to flow inside the nacelle 5. Therefore, an electric ventilation fan need not be installed inside the nacelle 5 as in the related art, and this simple configuration that involves no energy loss enables adequate cooling of the heat generating devices, such as the generator 11, installed inside the nacelle 5.

Since the outside-air delivery communicating parts 26 consists of the air delivering holes 24 formed an aperture formation on the rear side of the rotor head cover 14 and the air receiving holes 25 formed an aperture formation on the front side of the nacelle 5, and the air delivering holes 24 and the air receiving holes 25 have shapes that allow constant communication between the air delivering holes 24 and most portions of the air receiving holes 25 regardless of the rotational positions of the rotor head cover 14, it is possible to adequately cool the inside of the nacelle 5 by delivering the outside air stably into the nacelle 5 through the rotor-head-cover internal air duct 28 formed inside the rotor head cover 14.

The rotor-head-cover internal air duct 28, which is formed inside the rotor head cover 14, is formed so as to communicate with the air delivering holes 24 through the space between the rotor head 6 and the rotor head cover 14 from the outside-air intake 18. Since the rotor head 6 has a sealed structure against the rotor-head-cover internal air duct 28, the outside air introduced from the outside-air intake 18 is prevented from flowing into the rotor head 6. Thus, the outside air is delivered to the nacelle 5 side without being decreased in flow volume and flow rate. Therefore, the space inside the nacelle 5 can be cooled adequately. Although the rotor head 6 has a sealed structure, since the outside air flows along its outer surface, it is also possible to cool a pitch driving device etc. that is provided inside the rotor head 6 (not shown) indirectly.

Since the baffle plate 22 is provided at the outside-air intake 18 as a contaminant separation member for separating contaminants contained in the outside air, the contaminants such as water including rain, snow, etc. and dust etc. contained in the outside air introduced from the outside-air intake 18 are separated by the baffle plate 22. The separated contaminants fall off downward and are discharged to the outside from a drain hole (not shown). Therefore, while preventing adverse effects due to the contaminants on the devices installed inside the rotor head 6 and the nacelle 5, it is possible to cool the respective devices adequately.

Since the connection portion between the rotor head cover 14 and the nacelle 5 is provided with the outside-air anti-leaking structure 31 that prevents the outside air from flowing out through the rotor-head-cover internal air duct 28, the outside air introduced from the outside-air intake 18 is prevented from flowing out to the outside from the connection portion between the rotor head cover 14 and the nacelle 5. Thus, the outside air flowing through the rotor-head-cover internal air duct 28 is delivered to the nacelle 5 without being decreased in flow volume, and thereby, the space inside the nacelle 5 can be adequately cooled.

Furthermore, since the outside wind is taken into the nacelle 5 not only from the outside-air intake 18, but also from the front apertures 37 provided on the front side of the nacelle 5, it is possible to cool the space inside the nacelle 5 efficiently by increasing the volume of the outside wind introduced into the nacelle 5. Since these front apertures 37 are provided in the regions that are not hidden by the rotor head cover 14 when viewed from the rotor head 6 side, the front apertures 37 can be installed without providing a duct-like protruding part on the nacelle 5 and the exterior appearance of the nacelle 5 will not be spoiled.

In addition, since the outside-air anti-leaking structure 31 also functions as a rainwater-intrusion preventing structure, the intrusion of rainwater from the gap between the rotor head cover 14 and the nacelle 5 is prevented, and so, it is possible to maintain the soundness of the internal devices adequately.

The present invention is not limited to the configurations in the above-described embodiment, and modifications may be made to the extent that does not depart from the claims.

REFERENCE SIGNS LIST

1 wind turbine generator
4 tower
5 nacelle
6 rotor head
8 wind turbine blade
9 wind turbine rotor blade
11 generator
12 rotation shaft
14 rotor head cover
18 outside-air intake
22 baffle plate (contaminant separation member)
24 air delivering hole
25 air receiving hole
26 outside-air delivery communicating part
28 rotor-head-cover internal air duct 31 outside-air anti-leaking structure (rainwater-intrusion preventing structure)
32 internal step
33 outer step
35 cooling air outlet
37 front aperture

The invention claimed is:

1. An upwind wind turbine generator that is controlled such that a wind turbine rotor blade faces an upwind side, comprising:
   a rotor head equipped with wind turbine blades, to constitute the wind turbine rotor blades;
   a nacelle that bears a rotation shaft of the rotor head and houses a generator that generates electricity by a rotation of the rotor head;
   a tower that supports the nacelle;
   a rotor head cover that covers the rotor head;
   an outside-air intake that is provided on a distal end part of the rotor head cover and takes in outside wind;
   an outside-air delivery communicating part that delivers outside air, which has been taken into the rotor head cover from the outside-air intake, to an inside of the nacelle;
   a cooling air outlet that is provided in a region of an outer surface of the nacelle that experiences a negative pressure due to outside wind; and
   a rotor-head-cover internal air duct,
   wherein the outside-air delivery communicating part has:
      an air delivering hole formed as an aperture arrangement on a rear side of the rotor head cover; and
      an air receiving hole formed as an aperture arrangement on a front side of the nacelle;
   wherein the air delivering hole and the air receiving hole have a shape that allows communication between the air delivering hole and at least a part of the air receiving hole all the time regardless of a rotational position of the rotor head cover,
   wherein the rotor-head-cover internal air duct communicates with the air delivering hole through a space between the rotor head and the rotor head cover from the outside-air intake, and
   wherein the rotor head has a structure sealed against the rotor-head-cover internal air duct.

2. A wind turbine generator according to claim 1, wherein the outside-air intake is provided with a contaminant separation member that separates contaminant contained in the outside air.

3. A wind turbine generator according to claim 1, further comprising a front aperture that takes in the outside wind and that is formed in a region of the nacelle that is not hidden by the rotor head cover when viewed from a rotor head side.

4. A wind turbine generator according to claim 1, further comprising a structure having an internal step formed on a front side of the nacelle and an outer step formed at a peripheral portion on a rear end of the rotor head cover such that the outer step surrounds the internal step by overlapping without contacting the internal step.

5. A wind turbine generator according to claim 4, wherein said structure is formed between the rotor head cover and the nacelle to prevent a flow out of the outside air flowing inside the rotor head cover.

6. A wind turbine generator according to claim 4, wherein said structure is formed between the rotor head cover and the nacelle to prevent intrusion of rainwater.

* * * * *

UNITED STATES PATENT AND TRADEMARK OFFICE
CERTIFICATE OF CORRECTION

Page 1 of 1

PATENT NO. : 8,308,434 B2
APPLICATION NO. : 13/091587
DATED : November 13, 2012
INVENTOR(S) : Tomohiro Numajiri It is certified that error appears in the above-identified patent and that said Letters Patent is hereby corrected as shown below:

In Title page, item (63) at Related U.S. Application Data:

Please change "Continuation of application No. PCT/JP2011/051772, filed on January 28, 2010" to --Continuation of application No. PCT/JP2011/051772, filed on January 28, 2011--.

Signed and Sealed this
Eighteenth Day of February, 2014

Michelle K. Lee
*Deputy Director of the United States Patent and Trademark Office*